United States Patent
Ohkado

(10) Patent No.: US 12,189,397 B2
(45) Date of Patent: Jan. 7, 2025

(54) METHOD, APPARATUS, AND PROGRAM PRODUCT FOR LOCALIZING CENTER OF INTERSECTION

(71) Applicant: DENSO CORPORATION, Kariya (JP)

(72) Inventor: Makoto Ohkado, Kariya (JP)

(73) Assignee: DENSO CORPORATION, Kariya (JP)

( * ) Notice: Subject to any disclaimer, the term of this patent is extended or adjusted under 35 U.S.C. 154(b) by 656 days.

(21) Appl. No.: 17/131,218

(22) Filed: Dec. 22, 2020

(65) Prior Publication Data

US 2021/0191418 A1    Jun. 24, 2021

(30) Foreign Application Priority Data

Dec. 24, 2019   (JP) .................................. 2019-232554

(51) Int. Cl.
   *G05D 1/00*     (2024.01)
   *G06V 20/56*    (2022.01)
   *G06V 20/58*    (2022.01)

(52) U.S. Cl.
   CPC ......... *G05D 1/0246* (2013.01); *G05D 1/0219* (2013.01); *G06V 20/584* (2022.01); *G06V 20/588* (2022.01)

(58) Field of Classification Search
   CPC .. G05D 1/0246; G05D 1/0219; G06V 20/584; G06V 20/588; G06V 20/46; G06V 20/54; G06V 20/582; G08G 1/0133; G08G 1/091

See application file for complete search history.

(56) References Cited

U.S. PATENT DOCUMENTS

| | | | | |
|---|---|---|---|---|
| 2014/0136045 A1* | 5/2014 | Zhu | ........................ | B60T 17/221 701/23 |
| 2018/0112997 A1* | 4/2018 | Fasola | ................ | B60W 60/0011 |
| 2019/0347493 A1* | 11/2019 | Chen | ................... | G01C 21/3815 |
| 2020/0108806 A1* | 4/2020 | Ben Shalom | ............. | B60T 7/22 |
| 2020/0256698 A1* | 8/2020 | Shi | ..................... | G01C 21/3867 |

FOREIGN PATENT DOCUMENTS

JP    2019-018827 A    2/2019

* cited by examiner

*Primary Examiner* — Kenneth J Malkowski
*Assistant Examiner* — Ibrahim Abdoalatif Alsomairy
(74) *Attorney, Agent, or Firm* — MASCHOFF BRENNAN

(57) ABSTRACT

In an apparatus for localizing a center of an intersection, a data obtainer obtains, from a surrounding monitor that monitors a surrounding situation around a vehicle traveling on a road, data indicative of the surrounding situation. A road center identifier identifies a location of a center of the road based on the data indicative of the surrounding situation around the vehicle. A traffic light detector detects, based on the data indicative of the surrounding situation around the vehicle, at least two traffic light devices located in an intersection to which the road joins. A center localization unit detects an intersection point between the location of the center of the road identified by the road center identifier and a line connecting between the at least two traffic light devices detected by the traffic light detector, thus localizing the detected intersection point as a center of the intersection.

12 Claims, 10 Drawing Sheets

METHOD, APPARATUS, AND PROGRAM PRODUCT FOR LOCALIZING CENTER OF INTERSECTION

CROSS REFERENCE TO RELATED APPLICATION

This application is based on and claims the benefit of priority from Japanese Patent Application No. 2019-232554 filed on Dec. 24, 2019, the entire disclosure of which is incorporated herein by reference.

TECHNICAL FIELD

The present disclosure relates to methods, apparatuses, and program products for localizing the center of an intersection, and also to methods and apparatuses for identifying the type of a lane where an own vehicle is located, the lane being a part of an intersection.

BACKGROUND

In recent years, driving assistance technologies of vehicles, in particular, autonomous driving technologies of vehicles, have been widely researched and developed.

SUMMARY

An exemplary aspect of the present disclosure provides an apparatus for localizing a center of an intersection. The apparatus is configured to detect an intersection point between a location of a center of a road identified by a road center identifier and a line connecting between at least two traffic light devices detected by a traffic light detector, thus localizing the detected intersection point as a center of an intersection.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENT

Figure 1:
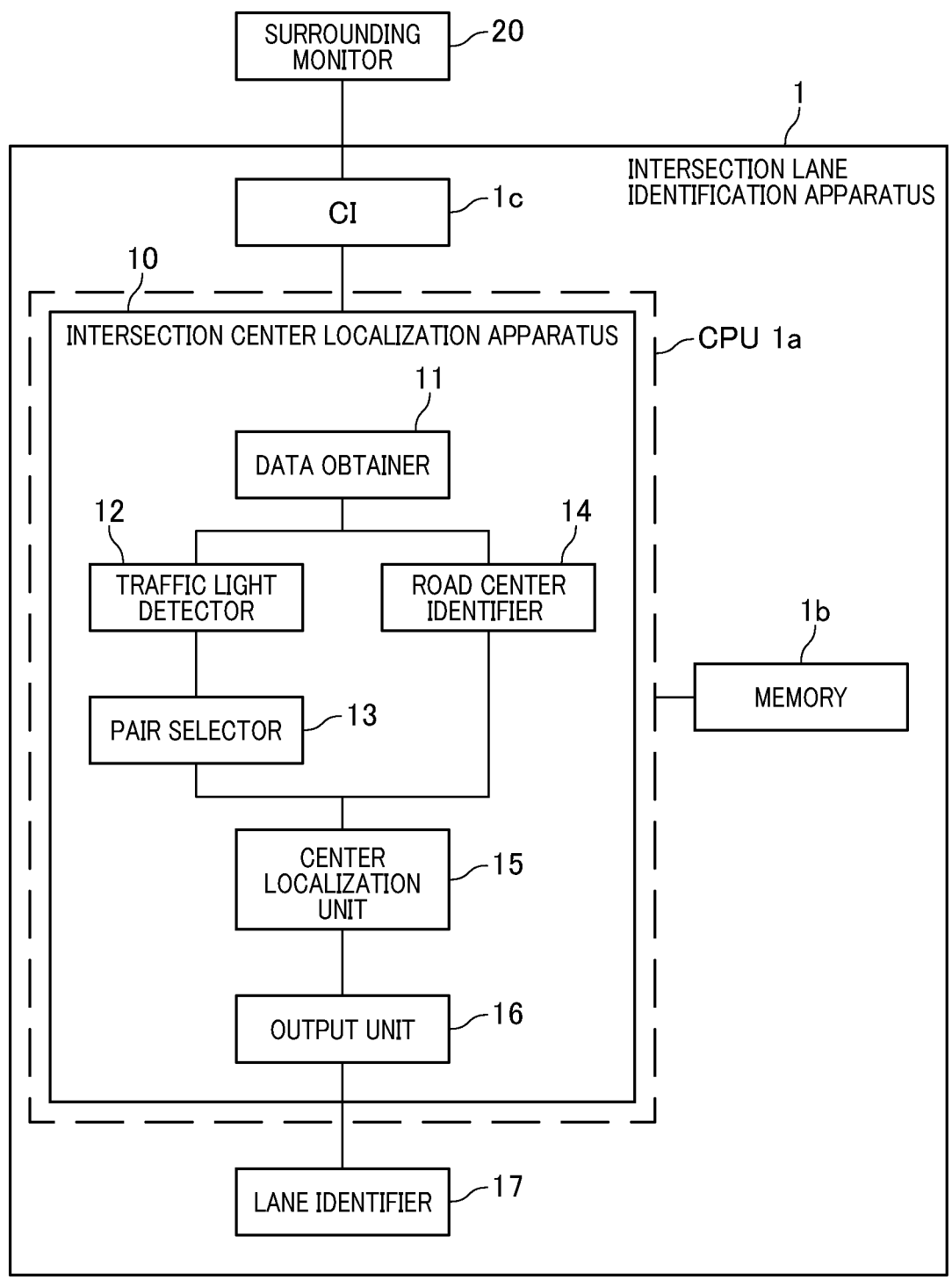
FIG. 1 is a block diagram schematically illustrating an example of the overall structure of an intersection lane identification apparatus according to the first embodiment of the present disclosure.

Japanese Patent Application publication No. 2019-18827 discloses a technology that assists the driving of a vehicle at an intersection without using road-to-vehicle communications. Specifically, the above known patent publication discloses a method of determining a target point in an intersection when a vehicle turns right in the intersection, creating, based on the target point, a traveling route in the intersection, and assisting the right turn of the vehicle in accordance with the created traveling route.

The method disclosed in the known patent publication detects the center of the intersection, and determines the target point in the intersection based on the detected center of the intersection.

The known patent publication discloses various approaches of detecting the center of an intersection (see paragraphs [0046] to [0050] thereof).

Advanced driving assist technologies and autonomous driving technologies need to detect (i) the configuration of an intersection, and (ii) a lane-junction relationship indicative of how the intersection joins to lanes for permitting a vehicle to reliably pass through the intersection. For detecting the configuration and lane-junction relationship of an intersection, these technologies can use (i) a first measure of using high definition maps for autonomous driving, and (ii) a second measure of estimating the configuration and lane-junction relationship of the intersection using autonomous sensors.

The first measure requires preparation of high definition maps for many general roads, resulting in high costs for the preparation of the high definition maps. This therefore may make it difficult for the advanced driving assist technologies and autonomous driving technologies to use the first measure for detecting the configuration of an intersection.

Regarding the second measure, the autonomous sensors have difficulty in recognizing complicated configurations of intersections.

More specifically, the second measure, which is likely to be more feasible in cost than the first measure, may have difficulty in 1. Estimating the configuration of an intersection due to the paucity of clues, such as information about lane markers and road edges, associated with the intersection 2. Recognizing the lane-junction relationship of the intersection The present disclosure aims to solve at least part of the issues described above.

According to a first exemplary aspect of the present disclosure, there is provided an apparatus for localizing a center of an intersection. The apparatus includes a data obtainer configured to obtain, from a surrounding monitor that monitors a surrounding situation around a vehicle traveling on a road, data indicative of the surrounding situation monitored by the surrounding monitor. The apparatus includes a road center identifier configured to identify a location of a center of the road based on the data indicative of the surrounding situation around the vehicle. The apparatus includes a traffic light detector configured to detect, based on the data indicative of the surrounding situation around the vehicle, at least two traffic light devices located in an intersection to which the road joins. The apparatus includes a center localization unit configured to detect an intersection point between the location of the center of the road identified by the road center identifier and a line connecting between the at least two traffic light devices detected by the traffic light detector, thus localizing the detected intersection point as a center of the intersection.

According to a second exemplary aspect of the present disclosure, there is provided an intersection lane identification apparatus. The intersection lane identification apparatus includes an intersection center localization apparatus. The intersection center localization apparatus includes a data obtainer configured to obtain, from a surrounding monitor that monitors a surrounding situation around a vehicle traveling on a road, data indicative of the surrounding situation monitored by the surrounding monitor. The intersection lane identification apparatus includes a road center identifier configured to identify a location of a center of the road based on the data indicative of the surrounding situation around the vehicle. The intersection lane identification apparatus includes a traffic light detector configured to detect, based on the data indicative of the surrounding situation around the vehicle, at least two traffic light devices located in an intersection to which the road joins. The intersection lane identification apparatus includes a center localization unit configured to detect an intersection point between the location of the center of the road identified by the road center identifier and a line connecting between the at least two traffic light devices detected by the traffic light detector, thus localizing the detected intersection point as a center of the intersection.

The intersection lane identification apparatus includes a lane identifier. The lane identifier is configured to (i) Obtain, based on the localized center of the intersection, a minimum distance of a traveling position of the vehicle from the localized center of the intersection in a width direction of the road (ii) Determine whether the obtained minimum distance is longer than or equal to a predetermined threshold distance (iii) Identify that the vehicle is located at a left turnable lane upon determining that the obtained minimum distance is longer than or equal to the predetermined threshold distance (iv) Identify that the vehicle is located at a right turnable lane upon determining that the obtained minimum distance is shorter than the predetermined threshold distance According to a third exemplary aspect of the present disclosure, there is provided a method of localizing a center of an intersection. The method includes (1) Obtaining, from a surrounding monitor that monitors a surrounding situation around a vehicle traveling on a road, data indicative of the surrounding situation monitored by the surrounding monitor (2) Identifying a location of a center of the road based on the data indicative of the surrounding situation around the vehicle (3) Detecting, based on the data indicative of the surrounding situation around the vehicle, at least two traffic light devices located in an intersection to which the road joins (4) Detecting an intersection point between the location of the center of the road and a line connecting between the at least two traffic light devices, thus localizing the detected intersection point as a center of the intersection According to a fourth exemplary aspect of the present disclosure, there is provided a method of localizing a center of an intersection. The method includes a computer-readable program product. The computer-readable program product includes a non-transitory computer-readable storage medium, and a set of computer program instructions stored in the computer-readable storage medium, the instructions causing a computer to 1. Obtain, from a surrounding monitor that monitors a surrounding situation around a vehicle traveling on a road, data indicative of the surrounding situation monitored by the surrounding monitor 2. Identify a location of a center of the road based on the data indicative of the surrounding situation around the vehicle 3. Detect, based on the data indicative of the surrounding situation around the vehicle, at least two traffic light devices located in an intersection to which the road joins 4. Detect an intersection point between the location of the center of the road and a line connecting between the at least two traffic light devices, thus localizing the detected intersection point as a center of the intersection.

EMBODIMENTS

The following describes exemplary embodiments of the present disclosure with reference to the accompanying drawings. In the exemplary embodiments and their modifications, like parts between the exemplary embodiments and their modifications are omitted or simplified to avoid redundant description.

First Embodiment

FIG. 1 schematically illustrates an intersection lane identification apparatus 1, which includes an intersection center localization apparatus 10, according to the first embodiment. The intersection lane identification apparatus 1 is for example installed in a vehicle V that is traveling on a lane, and is configured to identify the lane where the vehicle V is traveling.

The intersection lane identification apparatus 1 is communicable with a surrounding monitor 20 for monitoring a surrounding situation around the vehicle V. Specifically, the intersection lane identification apparatus 1 is adapted to cyclically obtain, from the surrounding monitor 20, data, which will be referred to as surrounding situation data; the data represents the surrounding situation around, i.e. the environment of, the vehicle V.

The intersection lane identification apparatus 1 is also adapted to identify, based on the obtained data, a lane where the vehicle V is traveling.

The surrounding monitor 20 includes, for example, one or more cameras and/or one or more millimeter-wave radars installed in the vehicle V for monitoring the surrounding situation around the vehicle V. The surrounding monitor 20 can include another type of sensors for monitoring the surrounding situation around the vehicle V.

For example, each of the cameras is configured to successively capture frame images around the vehicle V as video data, and output the video data comprised of the successively captured frame images to the intersection lane identification apparatus 1.

Each of the millimeter wave sensors is configured to emit millimeter waves around the vehicle V, receive echo millimeter waves resulting from reflection of the emitted radio waves by one or more objects located around the vehicle V, and generate, based on the received echo millimeter waves, surrounding situation information indicative of the situation around the vehicle V.

The intersection lane identification apparatus 1 includes the intersection center localization apparatus 10 and a lane identifier 17.

For example, the intersection lane identification apparatus 1 is comprised of at least one microcomputer comprised of a CPU 1a, a memory 1b comprised of, for example, a RAM, a ROM, and/or a hard disk drive, and a communication interface (CI) 1c. The intersection lane identification apparatus 1 can include a display device and an input device.

The CPU 1a is configured to cyclically obtain the surrounding situation data to accordingly store the obtained surrounding situation data in, for example, the RAM of the memory 1b, and run one or more programs stored in, for example, the ROM of the memory 1b, thus implementing various functions corresponding to the one or more programs in accordance with the surrounding situation data stored in the RAM of the memory 1b.

That is, the memory 1b serves as, for example, a non-transitory storage medium storing one or more programs. In other words, the CPU 1a runs one or more programs stored in the memory 1b, thus carrying out various methods corresponding to the one or more programs in accordance with the surrounding situation data stored in the memory 1b.

Note that the non-transitory storage medium is defined as a storage medium without transitory media, such as electromagnetic waves.

The intersection center localization apparatus 10 and the lane identifier 17 can be implemented by the CPU 1a of the intersection lane identification apparatus 1.

Referring to FIG. 1, the intersection center localization apparatus 10 functionally includes, for example, a data obtainer 11, a traffic light detector 12, a pair selector 13, a road center identifier 14, a center localization unit 15, and an output unit 16; these functional units 11 to 16 cooperatively localize the center of an intersection.

The data obtainer 11 is configured to cyclically obtain, from the surrounding monitor 20, surrounding situation data indicative of the surrounding situation around the vehicle V. The surrounding monitor 20 according to the first embodiment includes cameras, each of which is configured to successively capture frame images around the vehicle V as video data, and output the video data comprised of the successively captured frame images to the intersection lane identification apparatus 1. Then, the data obtainer 11 cyclically receives the video data from the surrounding monitor 20 as the surrounding situation data.

The road center identifier 14 is configured to identify the location of the center of the road on which the vehicle V is traveling; the road on which the vehicle V is traveling will be referred to as a current travel road. Note that the center of the road is defined as an imaginary line of the current travel road, which is equidistant from both edges of the current travel road. The defined center of the current travel road is based on the above concept, which is different from the concept of a center line based on the traffic regulations, but the defined center of the road can be in agreement with the center line based on the traffic regulations.

Specifically, the road center identifier 14 is configured to detect, based on the video data obtained from at least one of the cameras, the left and right edges of the current travel road, and identify the location of an imaginary line that is equidistant from the detected left and right edges as the center of the current travel road.

If the road center identifier 14 cannot identify the left edge of the current travel road due to one or more other vehicles located on the left side of the vehicle V in a lateral direction that is perpendicular to the longitudinal direction of the current travel road to block the view from the vehicle V to the left edge of the current travel road, the road center identifier 14 can perform an estimation approach that 1. Counts the number of one or more other vehicles located on the left side of the vehicle V in the lateral direction, which blocks the view from the vehicle V to the left edge of the vehicle V 2. Estimates, based on the counted number of one or more other vehicles, the minimum distance to the left edge of the current travel road from a predetermined reference point of the vehicle V 3. Identifies, based on the detected right edge and the estimated minimum distance to the left edge of the current travel road from the predetermined reference point of the vehicle V, the location of the center of the current travel road Specifically, the road center identifier 14 can suppose the counted number of one or more other vehicles located on the left side of the vehicle V in the lateral direction to block the view from the vehicle V to the left edge of the current travel road as the number of one or more left-side lanes, and multiply the counted number by a predetermined width of one lane of the current travel road, such as 3.5 m, thus measuring the minimum distance from the predetermined reference point of the vehicle V to the left edge of the current travel road. Then, the road center identifier 14 can identify the location of the center of the current travel road in accordance with the detected right edge and the measured minimum distance from the predetermined reference point of the vehicle V to the left edge.

Similarly, if the road center identifier 14 cannot identify the right edge of the current travel road due to one or more other vehicles traveling on one or more right-side lanes of the current travel road, the road center identifier 14 can be configured to 1. Estimate the minimum distance from the predetermined reference point of the vehicle V to the right edge in the same manner as the measurement of the minimum distance from the predetermined reference point of vehicle V to the left edge 2. Identify, based on the detected left edge and the estimated minimum distance to the right edge of the current travel road from the predetermined reference point of vehicle V, the location of the center of the current travel road If the road center identifier 14 cannot identify the left edge of the current travel road due to one or more other vehicles traveling on one or more left-side lanes of the current travel road, and cannot detect the right edge of the current travel road due to one or more other vehicles traveling on one or more right-side lanes of the current travel road, the road center identifier 14 can identify the location of the center of the current travel road in accordance with the estimated minimum distance from the predetermined reference point of the vehicle V to the left edge and the estimated minimum distance from the predetermined reference point of the vehicle V to the right edge.

If the road center identifier 14 estimates the center of the current travel road based on the number of one or more other vehicles, the road center identifier 14 can be configured to 1. Calculate an absolute difference between the estimated minimum distance from the predetermined reference point of the vehicle V to the left edge or right edge of the current travel road and a lateral distance between at least two traffic light devices described later 2. Determine whether the calculated absolute difference is greater or equal to a predetermined threshold 3. Estimate the minimum distance from the predetermined reference point of vehicle V to the left or right edge of the current travel road again upon determining that the calculated absolute difference is greater or equal to the predetermined threshold to accordingly determine that there may be a mistake in measurement of the minimum distance from the predetermined reference point of the vehicle V to the left or right edge of the current travel road The traffic light detector 12 is configured to detect, based on the surrounding situation data obtained by the data obtainer 11, at least two traffic light devices located in a target intersection around the vehicle V. Specifically, the traffic light detector 12 analyzes the video data using, for example, template pattern images of light traffic devices to accordingly detect at least two traffic light devices, and localizes each of the at least two traffic light devices located in the target intersection.

Note that the target intersection to be detected by the traffic light detector 12 is a junction where the current travel road of the vehicle V crosses at least one other road.

Figure 2:
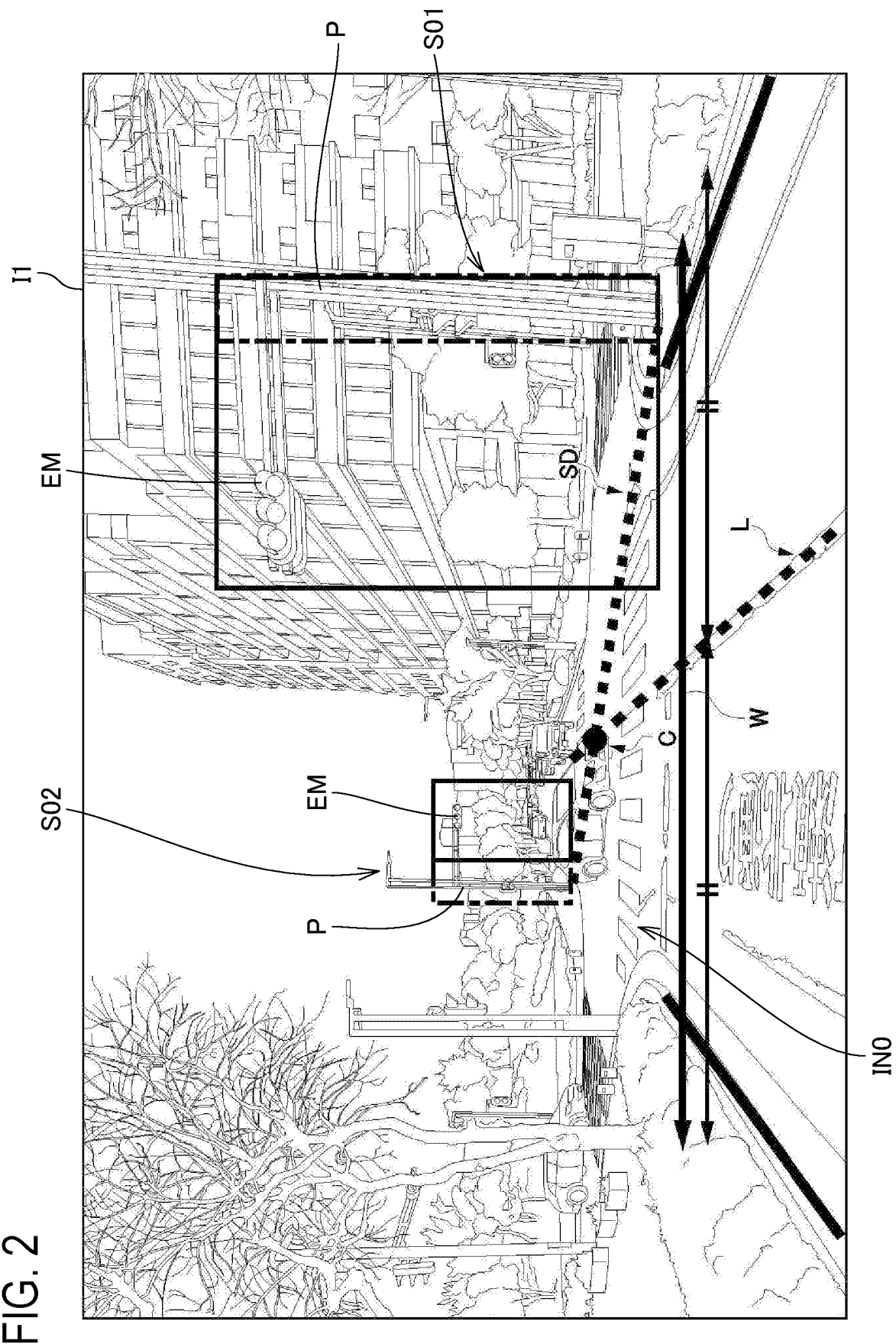
FIG. 2 is a view schematically illustrating a frame image showing a forward directional view of a vehicle.

FIG. 2 schematically illustrates one frame image I1 in the video data, which shows a forward directional view of the vehicle V. As illustrated in FIG. 2, in the frame image I1, two traffic light devices S01 and S02 located in a target intersection IN0, are included. Each of the traffic light devices S01 and S02 includes, for example, an emitting mechanism EM for emitting at least a red-light signal and a blue-light signal, and a pole P for supporting the emitting mechanism EM.

When detecting the at least two traffic light devices (for example, the traffic light devices S01 and S02), the traffic light detector 12 identifies the position of the pole P of the traffic light device S01 as a position of the traffic light device S01, and the position of the pole P of the traffic light device S02 as a position of the traffic light device S02.

The pair selector 13 is configured to select a pair of traffic light devices from at least three traffic light devices when the traffic light detector 12 detects the at least three traffic light devices.

Figure 3:
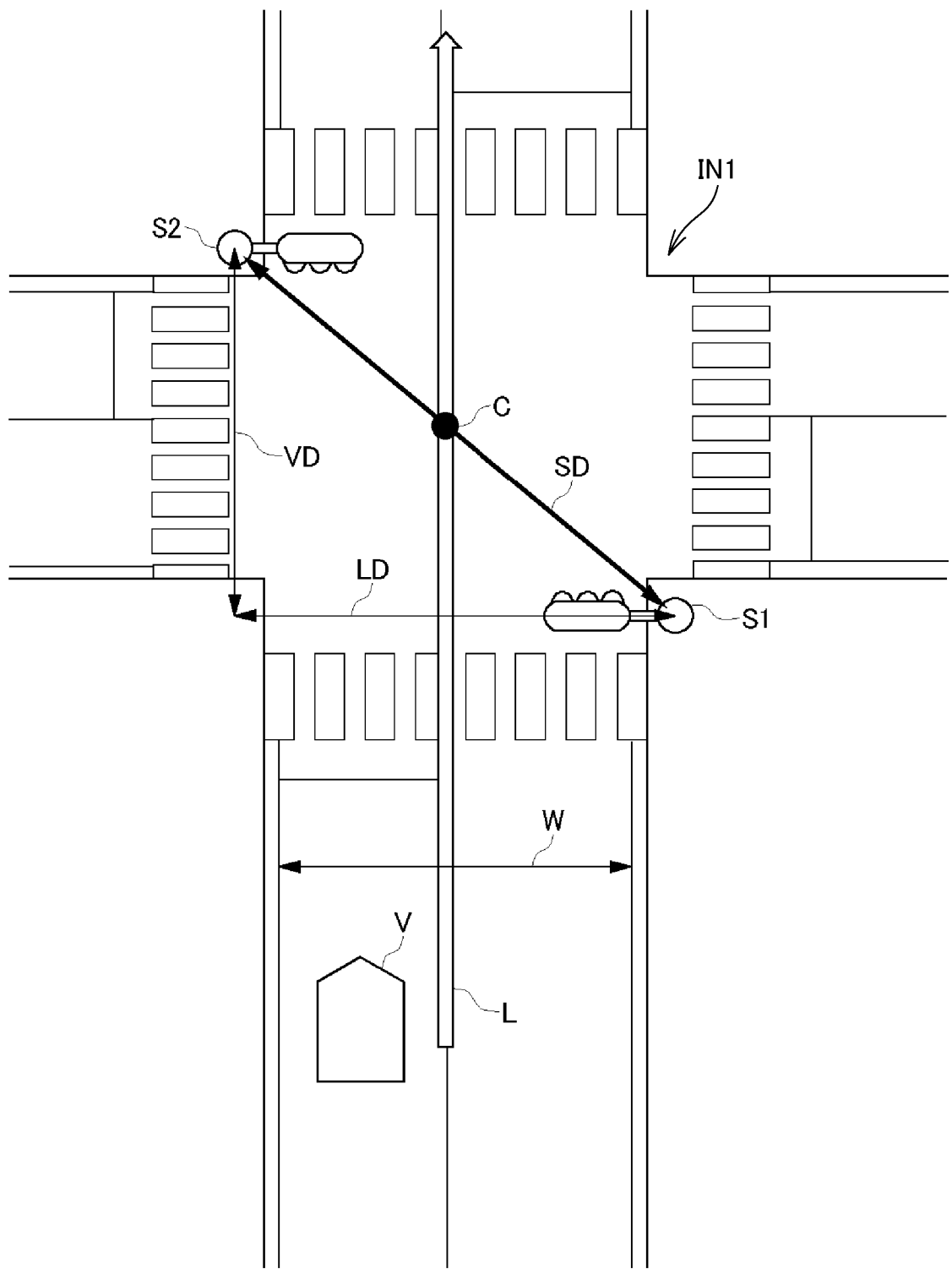
FIG. 3 is a schematic view of a target intersection where two traffic light devices are located.

FIG. 3 schematically illustrates a target intersection IN1 where a traffic light device S1 and a traffic light device S2 are located. That is, in the intersection IN1 illustrated in FIG. 3, the traffic light device S1 is located at a near-right corner of the target intersection IN1, and the traffic light device S2 is located at a far-left corner of the target intersection IN1 when viewed from the vehicle V.

A longitudinal distance VD between the traffic light devices S1 and S2 represents a minimum distance between the traffic light devices S1 and S2 along a direction parallel to the traveling direction of the vehicle V. A lateral distance LD between the traffic light devices S1 and S2 represents a minimum distance between the traffic light devices S1 and S2 along a direction perpendicular to the traveling direction of the vehicle V.

Specifically, the pair selector 13 calculates each of a value of the longitudinal distance VD and a value of the lateral distance LD between each adjacent pair of the at least three traffic light devices detected by the traffic light detector 12 to accordingly select, from the at least three traffic light devices, at least one adjacent pair of traffic light devices that have the value of the longitudinal distance VD and the value of the lateral distance LD; these values of the respective longitudinal and lateral distances VD and LD are each longer than or equal to a width (see reference character "W" in FIG. 3) of the current travel road of the vehicle V.

Let us assume that there are (1) A first pair of traffic light devices having a value of each of the longitudinal and lateral distances VD and LD being longer than or equal to the width of the current travel road (2) A second pair of traffic light devices having a value of each of the longitudinal and lateral distances VD and LD being longer than or equal to the width of the current travel road In this assumption, the pair selector 13 selects one of the first pair of traffic light devices and the second pair of traffic light devices which have a larger longitudinal distance VD therebetween.

The center localization unit 15 is configured to detect an intersection point between the center of the current travel road of the vehicle V and a line connecting between the pair of traffic light devices selected by the pair selector 13, thus localizing the detected intersection point as a center of the target intersection. If the traffic light detector 12 detects two traffic light devices, the center localization unit 15 is configured to localize an intersection point between the center of the current travel road of the vehicle V and a line connecting between the two traffic light devices detected by the traffic light detector 12, thus recognizing the detected intersection point as a center of the target intersection.

For example, for the target intersection IN1 illustrated in FIG. 3, the center localization unit 15 localizes, as the center of the intersection IN1, an intersection point C between the center (see reference character "L" in FIG. 3) of the current travel road of the vehicle V and the line (reference character "SD" in FIG. 3) connecting between the traffic light devices S1 and S2 of the selected pair.

The output unit 16 is configured to output, to the lane identifier 17, data indicative of the center of the target intersection localized by the center localization unit 15; this data indicative of the center of the target intersection localized by the center localization unit 15 will be referred to as intersection center data.

The lane identifier 17 is configured to identify a lane where the vehicle V is traveling in accordance with the surrounding situation data obtained from the surrounding monitor 20 and the intersection center data outputted from the output unit 16.

Specifically, the lane identifier 17 is configured to obtain, based on the intersection center data, a minimum distance of the traveling position of the vehicle V from the center of the target intersection in the width direction of the current travel road. Then, the lane identifier 17 is configured to 1. Determine whether the obtained minimum distance is longer than or equal to a predetermined threshold distance of, for example, 3 meters 2. Identify that the vehicle V is located at a left turnable lane, i.e. a lane where the vehicle V can turn left, upon determining that the obtained minimum distance is longer than or equal to the predetermined threshold distance 3. Identify that the vehicle V is located at a right turnable lane, i.e. a lane where the vehicle V can turn right, upon determining that the obtained minimum distance is shorter than the predetermined threshold distance Note that the left turnable lane represents a lane where a vehicle located at the lane can turn left, and the right turnable lane represents a lane where a vehicle located at the lane can turn right.

Additionally, the lane identifier 17 is configured to detect, based on the surrounding situation data, a division center line of a traveling-directional road across the target intersection to accordingly obtain a deviation Z of an extending line of the division center line from the center of the target intersection. Then, the lane identifier 17 is configured to determine whether the obtained deviation Z is larger than or equal to a predetermined threshold length of, for example, 0.5 meters, and determine that the target intersection includes a right-turn-only lane upon determining that the obtained deviation Z is larger than or equal to the predetermined threshold length.

Figure 4:
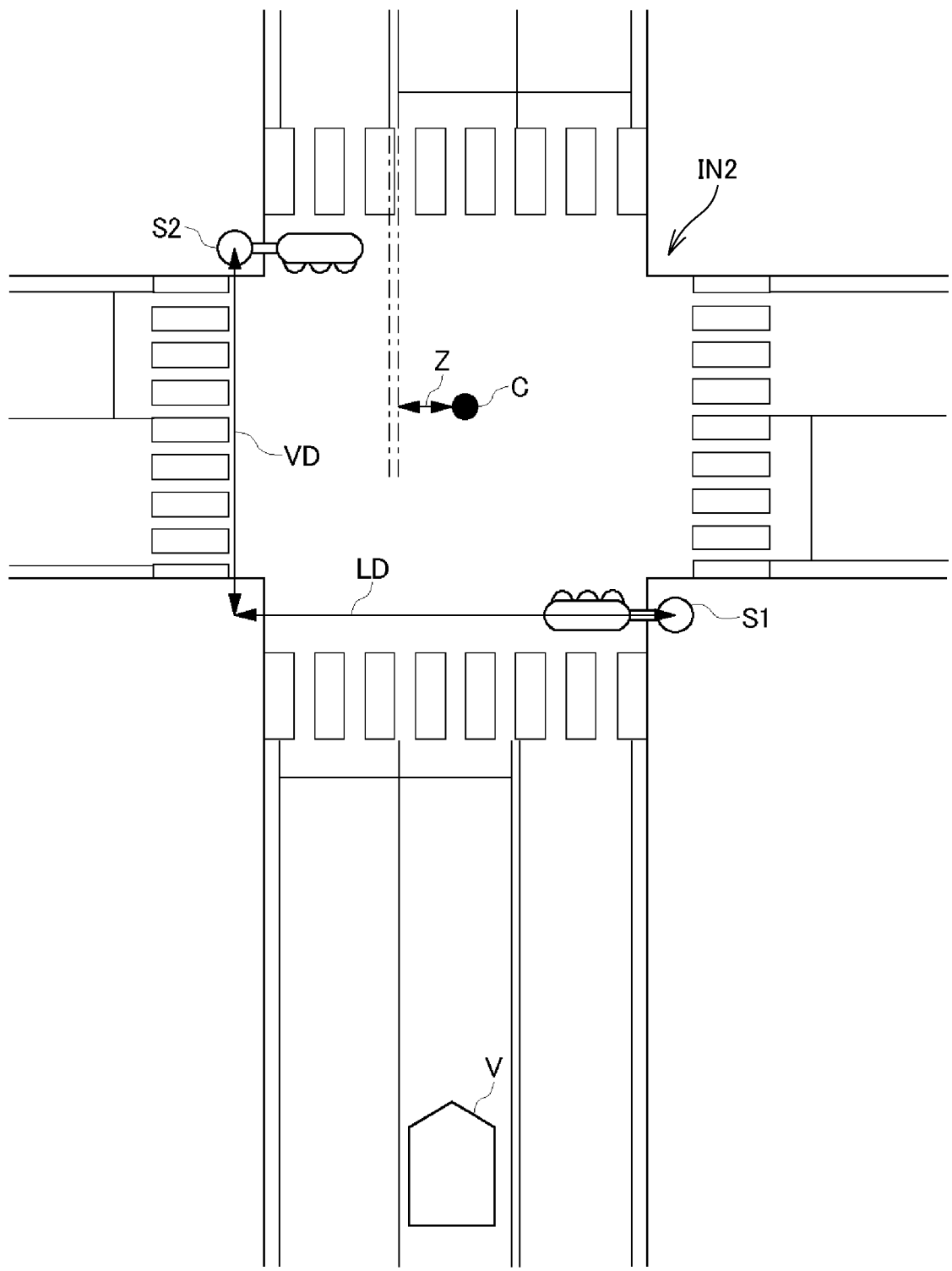
FIG. 4 is a schematic view of a target intersection whose situation is different from the target intersection illustrated in FIG. 3.

FIG. 4 illustrates a target intersection IN2, whose situation is different from that of the target intersection IN1. Specifically, a typical intersection, which has a right-turn-only lane, is configured such that the right-turn-only lane is located to be adjacent to the center of a road, resulting in the division center line of the road being deviated from the center of the typical intersection. This therefore makes it possible for the lane identifier 17 to determine that the target intersection has a right-turn-only lane upon determining that the obtained deviation Z is larger than or equal to the predetermined threshold length.

Additionally, the lane identifier 17 is configured to obtain, based on the surrounding situation data, a width of a crossing road constituting the target intersection and crossing to the current travel road, and determine whether the width of the crossing road is shorter than or equal to a predetermined threshold width of, for example, 5 meters. Specifically, the lane identifier 17 determines that the vehicle V is capable of only going straight ahead upon determining that the width of the crossing road is shorter than or equal to the predetermined threshold width.

Moreover, the lane identifier 17 is configured to determine, based on the surrounding situation data, whether there is a road across the target intersection along the traveling direction of the vehicle V, and determine that the vehicle V is capable of only turning right or left in the target intersection upon determining that there is not a road across the target intersection along the traveling direction of the vehicle V.

Figure 5:
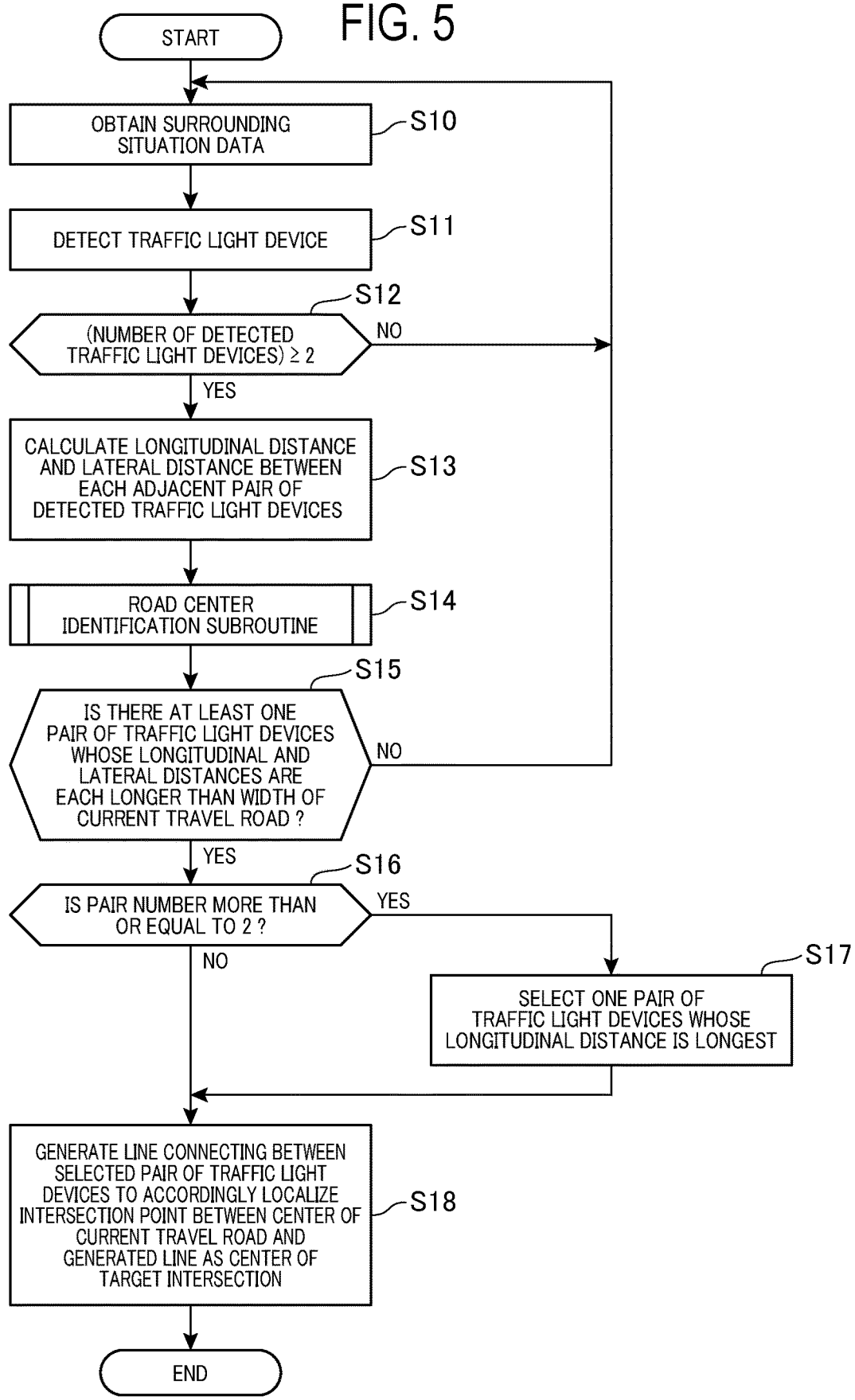
FIG. 5 is a flowchart schematically illustrating the sequence of an intersection center localizing routine.

Next, the following describes, with reference to the flowchart of FIG. 5, the sequence of an intersection center localizing routine, which will be referred to as a localizing routine, periodically carried out by the intersection lane identification apparatus 1. One localizing routine carried out by the intersection lane identification apparatus 1 will also be referred to as a cycle.

When starting the intersection center localizing routine, the intersection center localization apparatus 10 of the intersection lane identification apparatus 1 serves as, for example, the data obtainer 11 to receive surrounding situation data monitored by and sent from the surrounding monitor 20 in step S10.

Next, the intersection center localization apparatus 10 serves as, for example, the traffic light detector 12 to detect, based on the surrounding situation data, at least one traffic light in step S11.

In step S12, the intersection center localization apparatus 10 serves as, for example, the traffic light detector 12 to determine whether at least two traffic light devices located in an intersection are detected in step S11.

Upon determining that at least two traffic light devices are not detected in step S11 (NO in step S12), the intersection center localization apparatus 10 returns to the operation in step S10. Then, the intersection center localization apparatus 10 repeats the localizing routine from the operation in step S10 based on surrounding situation data each time of receiving the surrounding situation data monitored by and sent from the surrounding monitor 20 until the determination in step S12 is affirmative.

Otherwise, upon determining that at least two traffic light devices are detected in an intersection (YES in step S12), the intersection center localization apparatus 10 serves as, for example, the pair selector 13 to calculate, based on the surrounding situation data monitored by and sent from the surrounding monitor 20, a value of the longitudinal distance VD and a value of the lateral distance LD between each adjacent pair of the at least two traffic light devices detected in step S11 in step S13. Note that the intersection in which at least two traffic light devices are detected will also be referred to as a target intersection. The target intersection is defined as a junction where the current travel road of the vehicle V crosses at least one other road.

Next, the intersection center localization apparatus 10 serves as, for example, the road center identifier 14 to perform a road center identification subroutine in step S14.

Figure 6:
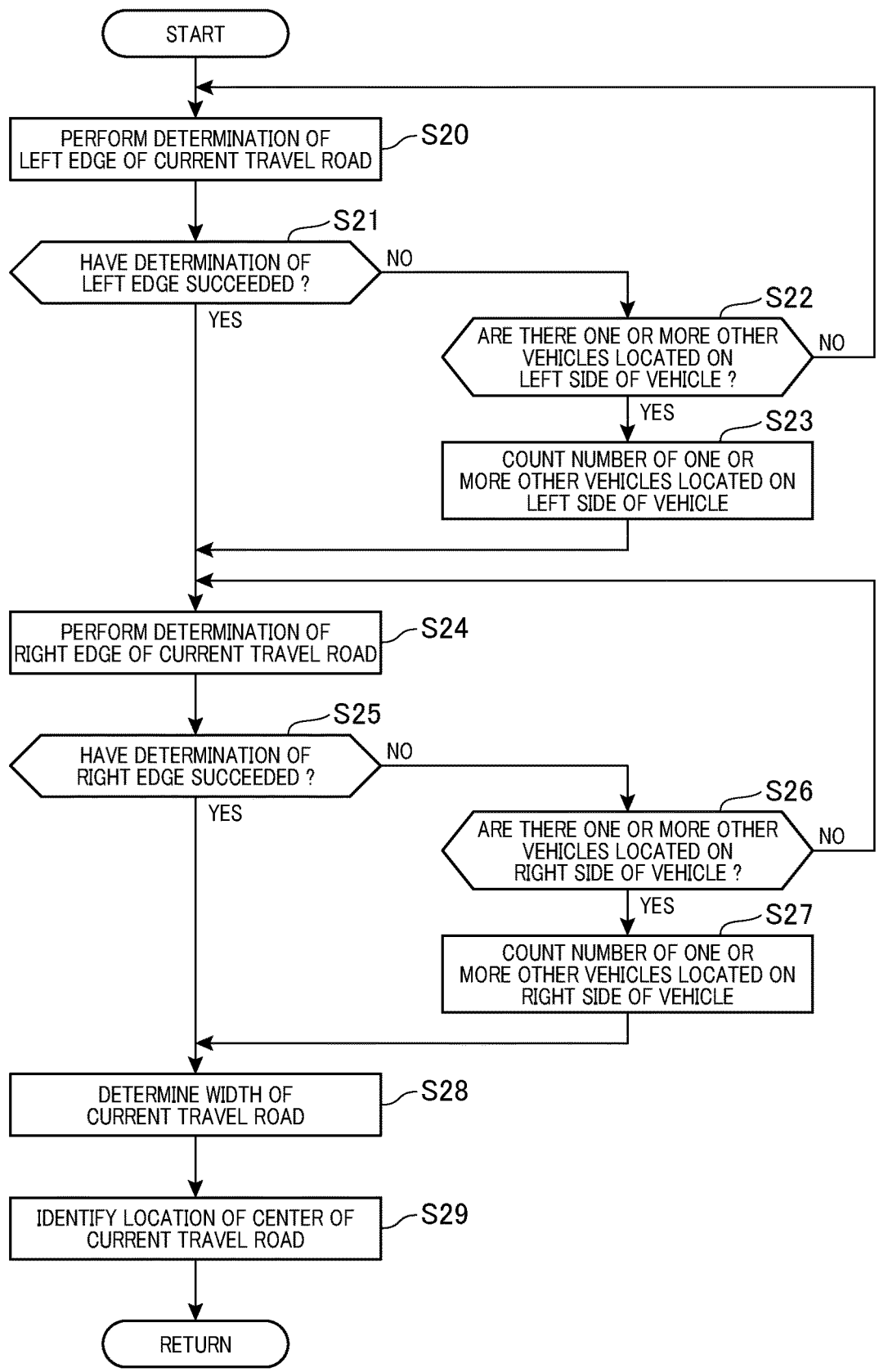
FIG. 6 is a flowchart schematically illustrating the sequence of a road center identification subroutine in the intersection center localizing routine.

The following describes the road center identification subroutine in step S14 with reference to a flowchart of FIG. 6.

The intersection center localization apparatus 10 serves as, for example, the road center identifier 14 to perform, based on video data obtained from at least one of the cameras and included in the surrounding situation data used in step S13, determination of the left edge of the current travel road in step S20 to thereby determine whether determination of the left edge of the current travel road has succeeded in step S21.

When determination of the left edge of the current travel road is determined to have succeeded (YES in step S21), the road center identification subroutine proceeds to step S24.

Otherwise, determination of the left edge of the current travel road is determined to have not succeeded (NO in step S21), the road center identification subroutine proceeds to step S22.

In step S22, the intersection center localization apparatus 10 serves as, for example, the road center identifier 14 to determine whether there are one or more other vehicles located on the left side of the vehicle V in the lateral direction to block the view from the vehicle V to the left edge of the current.

When it is determined that there are no other vehicles located on the left side of the vehicle V in the lateral direction (NO in step S22), the intersection center localization apparatus 10 returns to step S20. Then, the intersection center localization apparatus 10 serves as, for example, the road center identifier 14 to repeat the operations in steps S20 to S22 in accordance with video data obtained from at least one of the cameras and included in surrounding situation data monitored by and sent from the surrounding monitor 20; the video data monitored by and sent from the surrounding monitor 20 is, for example, newer than the immediately previous affirmative determination in step S22. If there are no affirmative determinations before this cycle of the localizing routine, the road center identifier 14 can repeat the operations in steps S20 to S22 in accordance with video data obtained by and sent from the surrounding monitor 20 after the negative determination in step S22 of this cycle of the localizing routine. The repetition of the operations in step S20 to S22 until the determination in step S22 is affirmative.

Otherwise, when it is determined that there are one or more other vehicles located on the left side of the vehicle V in the lateral direction (YES in step S22), the intersection center localization apparatus 10 counts the number of one or more other vehicles located on the left side of the vehicle V in the lateral direction in step S23.

Following the operation in step S23, the intersection center localization apparatus 10 serves as, for example, the road center identifier 14 to perform, based on video data obtained from at least one of the cameras and included in the surrounding situation data used in step S13, determination of the right edge of the current travel road in step S24 to thereby determine whether determination of the right edge of the current travel road has succeeded in step S25.

When determination of the right edge of the current travel road is determined to have succeeded (YES in step S25), and the road center identification subroutine proceeds to step S28.

Otherwise, determination of the right edge of the current travel road is determined to have not succeeded (NO in step S25), and the road center identification subroutine proceeds to step S26.

In step S26, the intersection center localization apparatus 10 serves as, for example, the road center identifier 14 to determine whether there are one or more other vehicles located on the right side of the vehicle V in the lateral direction to block the view from the vehicle V to the right edge of the current.

When it is determined that there are no other vehicles located on the right side of the vehicle V in the lateral direction (NO in step S26), the intersection center localization apparatus 10 returns to step S24. Then, the intersection center localization apparatus 10 serves as, for example, the road center identifier 14 to repeat the operations in steps S24 to S26 in accordance with video data obtained from at least one of the cameras and included in surrounding situation data monitored by and sent from the surrounding monitor 20 in response to negative determination in step S26; the video data monitored by and sent from the surrounding monitor 20 is, for example, newer than the immediately previous affirmative determination in step S26. If there are no affirmative determinations before this cycle of the localizing routine, the road center identifier 14 can repeat the operations in steps S24 to S26 in accordance with video data obtained by and sent from the surrounding monitor 20 after the negative determination in step S26 of this cycle of the localizing routine. The repetition of the operations in step S24 to S26 until the determination in step S26 is affirmative.

Otherwise, when it is determined that there are one or more other vehicles located on the right side of the vehicle V in the lateral direction (YES in step S26), the intersection center localization apparatus 10 counts the number of one or more other vehicles located on the right side of the vehicle V in the lateral direction in step S27.

Following the affirmative determination in step S25 or the operation in step S27, the intersection center localization apparatus 10 serves as, for example, the road center identifier 14 to determine, in step S28, the width of the current travel road in accordance with one of I. The detected left and right edges of the current travel road II. The detected left edge of the current travel road and the counted number of one or more other vehicles located on the right side of the vehicle V in the lateral direction III. The detected right edge of the current travel road and the counted number of one or more other vehicles located on the left side of the vehicle V in the lateral direction IV. The counted number of one or more other vehicles located on the left side of the vehicle V in the lateral direction and the counted number of one or more other vehicles located on the left side of the vehicle V in the lateral direction For example, for the second case II, i.e. for the case of NO in step S25, the road center identifier 14 estimates, based on the counted number of one or more other vehicles located on the right side of the vehicle V in the lateral direction, the minimum distance to the right edge of the current travel road from the predetermined reference point of the vehicle V. Then, the road center identifier 14 determines the width of the current travel road based on the detected left edge of the current travel road and the estimated minimum distance to the right edge of the current travel road from the predetermined reference point of the vehicle V.

For the third case III, i.e. for the case of NO in step S21, the road center identifier 14 estimates, based on the counted number of one or more other vehicles located on the left side of the vehicle V in the lateral direction, the minimum distance to the left edge of the current travel road from the predetermined reference point of the vehicle V. Then, the road center identifier 14 determines the width of the current travel road based on the detected right edge of the current travel road and the estimated minimum distance to the left edge of the current travel road from the predetermined reference point of the vehicle V.

For the fourth case IV, i.e. for the case of NO in each of steps S21 and S25, the road center identifier 14 estimates, based on the counted number of one or more other vehicles located on the left side of the vehicle V in the lateral direction, the minimum distance to the left edge of the current travel road from the predetermined reference point of the vehicle V. Additionally, the road center identifier 14 estimates, based on the counted number of one or more other vehicles located on the right side of the vehicle V in the lateral direction, the minimum distance to the right edge of the current travel road from the predetermined reference point of the vehicle V.

Then, the road center identifier 14 determines the width of the current travel road based on the estimated minimum distance to each of the left and right edges of the current travel road from the predetermined reference point of the vehicle V.

Following the operation in step S28, the intersection center localization apparatus 10 serves as, for example, the road center identifier 14 to identify, based on the determined width of the current travel road, the location of an imaginary line of the current travel road, which is equidistant from both the left and right edges of the current travel road, to accordingly calculate the center of the current travel road based on the identified imaginary line in step S29. This terminates the road center identification subroutine in S14, so that execution of the road center identification subroutine proceeds to step S15 of the main routine, i.e. the localizing routine.

In response to the termination of the road center identification subroutine in S14, the intersection center localization apparatus 10 serves as, for example, the pair selector 13 to perform a traffic-light pair selection task in step S15.

Specifically, the traffic-light pair selection task in step S15 determines whether there is at least one pair of traffic light devices in the at least two traffic light devices detected by the operation in step S12; the values of the longitudinal and lateral distances VD and LD of the at least one pair of traffic light devices are each longer than or equal to the width of the vehicle V.

We consider a first case where it is determined that there are no pairs of traffic light devices in the at least two traffic light devices detected by the operation in step S12; the values of the longitudinal and lateral distances VD and LD of each pair of traffic light devices are each shorter than the width of the vehicle V (NO in step S15). In response to the negative determination in step S15, the intersection center localization apparatus 10 returns to the operation in step S10. Then, the intersection center localization apparatus 10 repeats the localizing routine from the operation in step S10 based on surrounding situation data each time of receiving the surrounding situation data monitored by and sent from the surrounding monitor 20.

Otherwise, we consider a second case where it is determined that there is at least one pair of traffic light devices in the at least two traffic light devices detected by the operation in step S12; the values of the longitudinal and lateral distances VD and LD of the at least one pair of traffic light devices are each longer than or equal to the width of the vehicle V (YES in step S15).

In response to the affirmative determination in step S15, the intersection center localization apparatus 10 serves as, for example, the pair selector 13 to determine whether there are at least two pairs of traffic light devices in the at least two traffic light devices detected by the operation in step S12; values of the longitudinal and lateral distances VD and LD of each of the at least two pairs of traffic light devices are each longer than or equal to the width of the vehicle V in step S16. The number of at least one pair of traffic light devices, the value of each of the longitudinal and lateral distances VD and LD of which is longer than or equal to the width of the vehicle V, will also be referred to as a pair number.

That is, the determination in step S16 is determination of whether the pair number is more than or equal to 2.

We consider a first case where it is determined that there are at least two pairs of traffic light devices in the at least two traffic light devices detected by the operation in step S12; values of the longitudinal and lateral distances VD and LD of each of the at least two pairs of traffic light devices are each longer than or equal to the width of the vehicle V (YES in step S16).

In response to the affirmative determination in step S16, the intersection center localization apparatus 10 serves as, for example, the pair selector 13 to select one pair of traffic light devices in the at least two pairs of traffic light devices; the value of the longitudinal distance VD of the selected pair of traffic light devices is longest in the at least two pairs of traffic light devices in step S17.

Following the negative determination in step S16 or the operation in step S17, the intersection center localization apparatus 10 serves as, for example, the center localization unit 15 to localize an intersection point, i.e. identify the location of the intersection point, between the center of the current travel road of the vehicle V and a line connecting between the pair of traffic light devices selected in step S15 or S17, thus recognizing the localized intersection point as a center of the target intersection in step S18.

Then, the intersection center localization apparatus 10 serves as, for example, the output unit 16 to output intersection center data indicative of the center of the target intersection to the lane identifier 17 in step S18.

Figure 7:
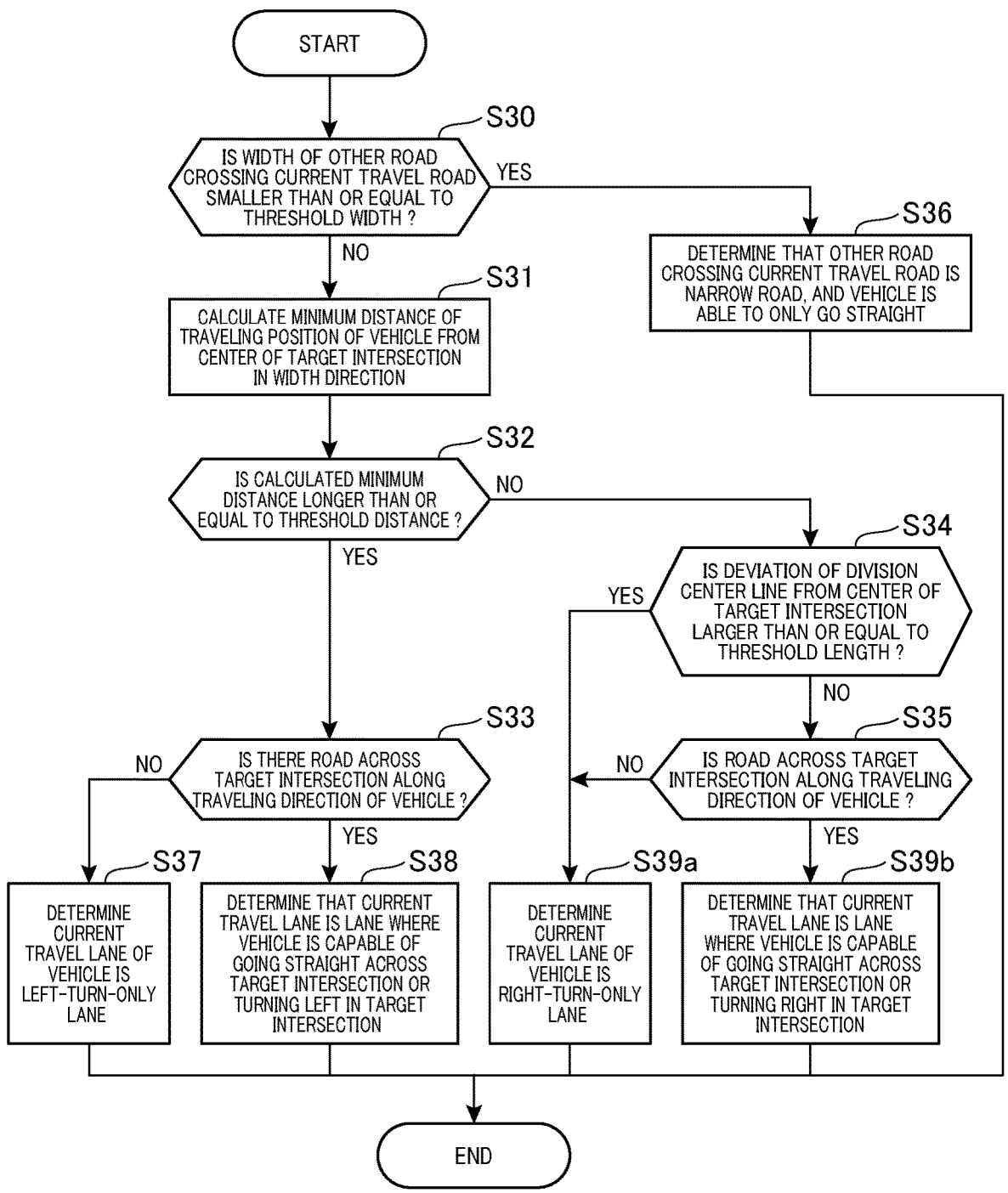
FIG. 7 is a flowchart schematically illustrating the sequence of a lane identification routine.

The following describes a lane identification routine carried out by the load identifier 17 of the intersection lane identification apparatus 1 in response to, for example, receiving the intersection center data with reference to a flowchart of FIG. 7.

When starting the lane identification routine, the lane identifier 17 obtains the width of the at least one other road crossing the current travel road of the vehicle V in accordance with the surrounding situation data obtained in step S10 or the surrounding situation data currently obtained from the surrounding monitor 20 in step S30. Then, the lane identifier 17 determines whether the obtained width of the at least one other road crossing the current travel road is smaller than or equal to the predetermined threshold width in step S30.

Upon determining that the obtained width of the at least one other road crossing the current travel road is smaller than or equal to the predetermined threshold width (YES in step S30), the lane identifier 17 determines that the at least one other road crossing the current travel road is a narrow road where it is difficult for vehicles to travel, thus determining that a lane where the vehicle V is traveling included in the current travel road is a straight only lane where the vehicle V is able to only go straight in step S36. The lane where the vehicle V is traveling will also be referred to as a current travel lane. Thereafter, the lane identifier 17 terminates lane identification routine.

Otherwise, when it is determined that the obtained width of the at least one other road crossing the current travel road is larger than or equal to the predetermined threshold width (NO in step S30), the lane identification routine proceeds to step S31.

In step S31, the lane identifier 17 calculates, based on the intersection center data, a minimum distance of the traveling position of the vehicle V from the center of the target intersection in the width direction of the current travel road. Then, the lane identifier 17 determines whether the obtained minimum distance is longer than or equal to the predetermined threshold distance of, for example, 3 meters in step S32.

Upon determining that the obtained minimum distance is longer than or equal to the predetermined threshold distance (YES in step S32), the lane identifier 17 determines whether there is a road across the target intersection along the traveling direction of the vehicle V in step S33.

Upon determining that there is not a road across the target intersection along the traveling direction of the vehicle V (NO in step S33), the lane identifier 17 determines that the current travel lane is a left-turn-only lane where the vehicle V is capable of only turning left in the target intersection in step S37. Thereafter, the lane identifier 17 terminates lane identification routine.

Otherwise, upon determining that there is a road crossing across the target intersection along the traveling direction of the vehicle V (YES in step S33), the lane identifier 17 determines that the current travel lane is a lane where the vehicle V is capable of going straight across the target intersection or turning left in the target intersection in step S38. Thereafter, the lane identifier 17 terminates lane identification routine.

On the other hand, upon determining that the obtained minimum distance is smaller than the predetermined threshold distance (NO in step S32), the lane identifier 17 detects a division center line of a traveling-directional road across the target intersection in accordance with the surrounding situation data obtained in step S10 or the surrounding situation data currently obtained from the surrounding monitor 20 to accordingly obtain the deviation Z of the extending line of the division center line from the center of the target intersection in step S34.

Then, in step S34, the lane identifier 17 determines whether the obtained deviation Z is larger than or equal to the predetermined threshold length of, for example, 0.5 meters.

Upon determining that the obtained deviation Z is larger than or equal to the predetermined threshold length (YES in step S34), the lane identifier 17 determines that the current travel lane is a right-turn-only lane where the vehicle V is capable of only turning right in the target intersection in step S39a. Thereafter, the lane identifier 17 terminates lane identification routine.

Otherwise, upon determining that the obtained deviation Z is smaller than the predetermined threshold length (NO in step S34), the lane identifier 17 determines whether there is a road across the target intersection along the traveling direction of the vehicle V in step S35.

Upon determining that there is not a road across the target intersection along the traveling direction of the vehicle V (NO in step S35), the lane identifier 17 determines that the current travel lane is a right-turn-only lane where the vehicle V is capable of only turning right in the target intersection in step S39a. Thereafter, the lane identifier 17 terminates lane identification routine.

Otherwise, upon determining that there is a road across the target intersection along the traveling direction of the vehicle V (YES in step S35), the lane identifier 17 determines that the current travel lane is a lane where the vehicle V is capable of going straight across the target intersection and turning right in the target intersection in step S39b. Thereafter, the lane identifier 17 terminates lane identification routine.

As described above, the intersection center localization apparatus 10 of the intersection lane identification apparatus 1 is configured to localize the center of the target intersection where the vehicle V is going to enter in accordance with the identified location of at least one pair of light traffic devices located in the target intersection.

This configuration therefore makes it possible to localize the center of the target intersection more easily than the other measures described in the above known patent publication, thus easily estimating the configuration of the intersection in accordance with the localized center of the intersection, and the identified location of each of the light traffic devices of the at least one pair. This is because a typical intersection has at least one pair of light traffic devices located diagonally opposite to each other at respective near and far corners of the intersection.

The intersection lane identification apparatus 1 is configured to identify how the current travel lane of the vehicle V joins to the target intersection that constitutes a part of the target intersection more easily based on the localized center of the target intersection.

Second Embodiment

The following describes an intersection lane identification apparatus 2 according to the second embodiment. To one or more components of the intersection lane identification apparatus 2 according to the second embodiment, which are identical to those of the intersection lane identification apparatus 1 according to the first embodiment, identical reference characters are respectively assigned, so that detailed descriptions of the one or more components are omitted.

Like the first embodiment, the intersection lane identification apparatus 2 is comprised of at least one microcomputer comprised of a CPU 2a, a memory 2b comprised of, for example, a RAM, a ROM, and/or a hard disk drive, and a communication interface (CI) 2c. The intersection lane identification apparatus 2 can include a display device and an input device.

The intersection lane identification apparatus 2 is for example installed in a vehicle V that is traveling on a lane, and is configured to identify the lane where the vehicle V is traveling.

Figure 8:
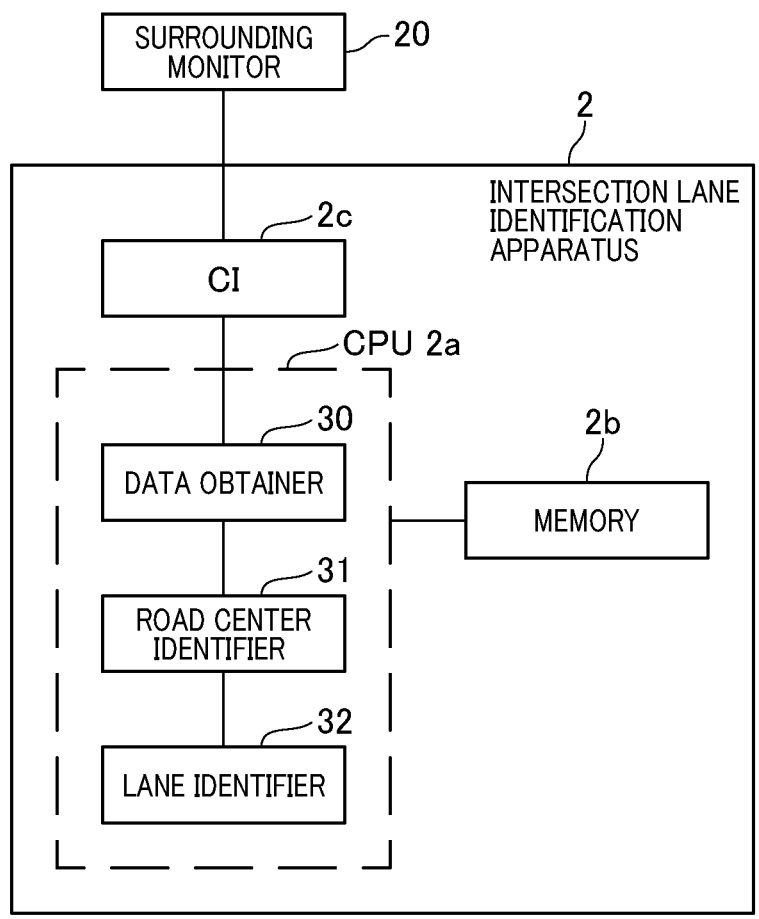
FIG. 8 is a block diagram schematically illustrating an example of the overall structure of an intersection lane identification apparatus according to the second embodiment of the present disclosure.

Referring to FIG. 8, the intersection lane identification apparatus 2 functionally includes, for example, a data obtainer 30, a road center identifier 31, and a lane identifier 32.

The data obtainer 30 is configured to cyclically obtain, from the surrounding monitor 20, surrounding situation data indicative of the surrounding situation around the vehicle V. The surrounding monitor 20 according to the second embodiment includes cameras, each of which is configured to successively capture frame images around the vehicle V as video data, and output the video data comprised of the successively captured frame images to the intersection lane identification apparatus 2. Then, the data obtainer 30 cyclically receives the video data from the surrounding monitor 20 as the surrounding situation data.

The road center identifier 31 is configured to identify the location of the center of the current travel road of the vehicle V. Note that the center of the road is defined as an imaginary line of the current travel road, which is equidistant from both edges of the current travel road. The defined center of the current travel road is based on the above concept, which is different from the concept of a center line based on the traffic regulations, but the defined center of the road can be in agreement with the center line based on the traffic regulations.

Specifically, the road center identifier 31 is configured to identify, based on the video data obtained from at least one of the cameras, the left and right edges of the current travel road, and identify the location of an imaginary line that is equidistant from the detected left and right edges as the center of the current travel road.

If the road center identifier 31 cannot identify the left edge of the current travel road due to one or more other vehicles located on the left side of the vehicle V in a lateral direction that is perpendicular to the longitudinal direction of the current travel road to block the view from the vehicle V to the left edge of the current travel road, the road center identifier 31 can perform an estimation approach that 1. Counts the number of one or more other vehicles located on the left side of the vehicle V in the lateral direction to block the view from the vehicle V to the left edge of the vehicle V 2. Estimates, based on the counted number of one or more other vehicles, the minimum distance to the left edge of the current travel road from a predetermined reference point of the vehicle V 3. Identifies, based on the detected right edge and the estimated minimum distance to the left edge of the current travel road from the predetermined reference point of the vehicle V, the location of the current travel road of the vehicle V Specifically, the road center identifier 31 can estimate the counted number of one or more other vehicles located on the left side of the vehicle V in the lateral direction which block the view from the vehicle V to the left edge of the current travel road as the number of one or more left-side lanes, and multiply the counted number by a predetermined width of one lane of the current travel road, such as 3.5 m, thus measuring the minimum distance from the predetermined reference point of the vehicle V to the left edge of the current travel road. Then, the road center identifier 31 can identify the location of the center of the current travel road in accordance with the detected right edge and the measured minimum distance from the predetermined reference point of the vehicle V to the left edge.

Similarly, if the road center identifier 31 cannot identify the right edge of the current travel road due to one or more other vehicles traveling on one or more right-side lanes of the current travel road, the road center identifier 31 can be configured to 1. Estimate the minimum distance from the predetermined reference point of the vehicle V to the right edge in the same manner as the measurement of the minimum distance from the predetermined reference point of vehicle V to the left edge 2. Identify, based on the detected left edge and the estimated minimum distance to the right edge of the current travel road from the predetermined reference point of vehicle V, the location of the center of the current travel road If the road center identifier 31 cannot identify the left edge of the current travel road due to one or more other vehicles traveling on one or more left-side lanes of the current travel road, and cannot detect the right edge of the current travel road due to one or more other vehicles traveling on one or more right-side lanes of the current travel road, the road center identifier 31 can identify the location of the center of the current travel road in accordance with the estimated minimum distance from the predetermined reference point of the vehicle V to the left edge and the estimated minimum distance from the predetermined reference point of the vehicle V to the right edge.

The road center identifier 31 is further configured to output, to the lane identifier 32, data indicative of the location of the center of the current travel road; this data indicative of the location of the center of the current travel road will be referred to as road center data.

That is, the configuration and functions of the road center identifier 31 are substantially identical to those of the road center identifier 14.

The lane identifier 32 is configured to identify a lane where the vehicle V is traveling in accordance with the surrounding situation data obtained from the surrounding monitor 20 and the lane center data outputted from the road center identifier 31.

Specifically, the lane identifier 32 is configured to obtain, based on the intersection center data, a deviated distance of the traveling position of the vehicle V from the center of the current travel road in the width direction of the current travel road. Then, the lane identifier 32 is configured to 1. Determine whether the obtained deviated distance is longer than or equal to a predetermined threshold distance of, for example, 3 meters 2. Identify that the vehicle V is located at a left turnable lane upon determining that the obtained deviated distance is longer than or equal to the predetermined threshold distance 3. Identify that the vehicle V is located at a right turnable lane upon determining that the obtained deviated distance is shorter than the predetermined threshold distance Additionally, the lane identifier 32 is configured to detect, based on the surrounding situation data, a division center line of a traveling-directional road across the target intersection to accordingly obtain a minimum distance Z1 of an extending line of the division center line from the center of the current travel road. Then, the lane identifier 32 is configured to determine whether the obtained minimum distance Z1 is larger than or equal to a predetermined threshold length of, for example, 0.5 meters, and determine that the target intersection includes a right-turn-only lane upon determining that the obtained minimum distance Z1 is larger than or equal to the predetermined threshold length.

Figure 9:
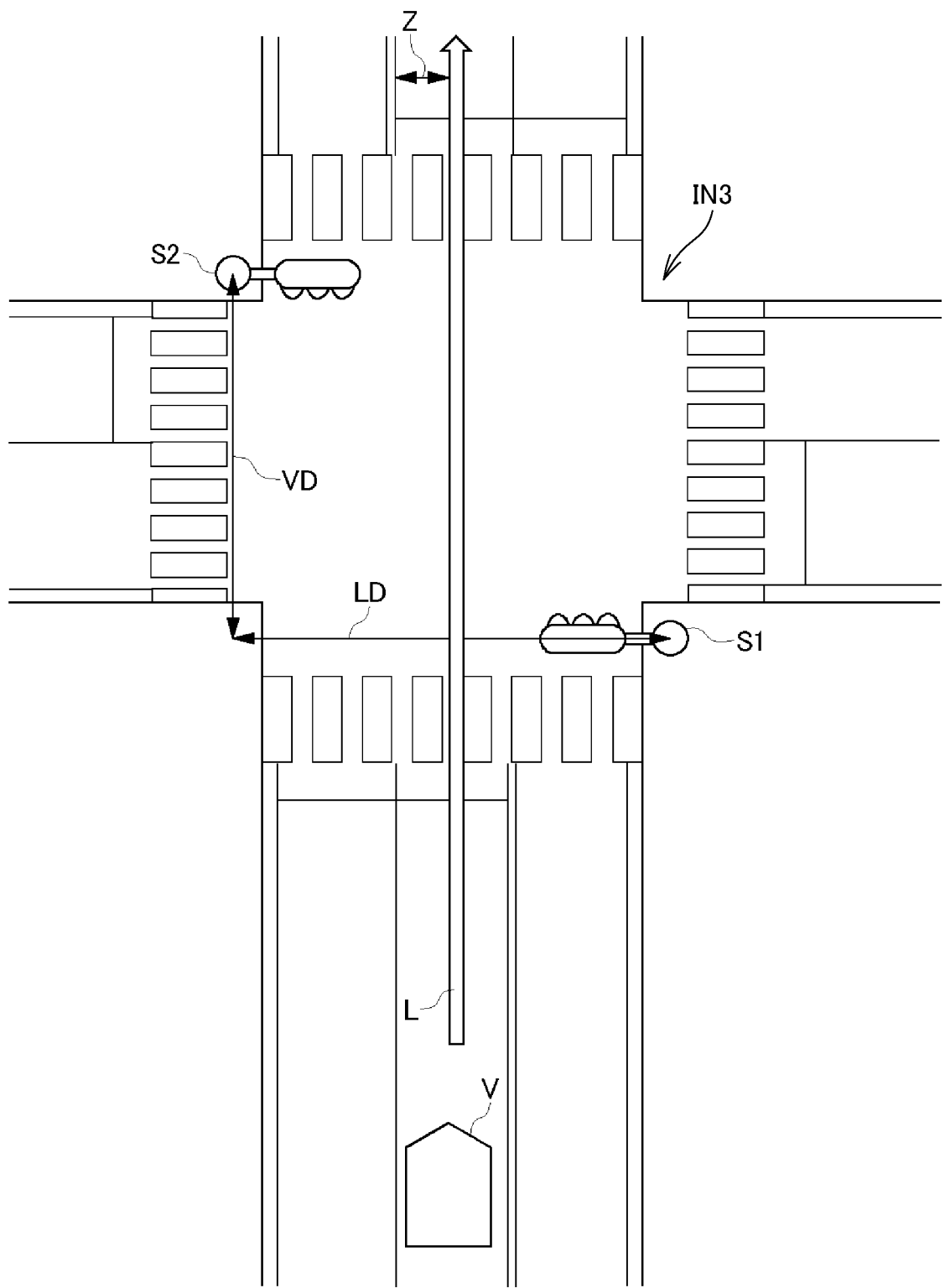
FIG. 9 is a schematic view of a target intersection where two traffic light devices are located, which is used to show how to identify a right-turn-only lane according to the second embodiment.

FIG. 9 illustrates a target intersection IN3, whose situation is different from that of the target intersection IN1. Specifically, a typical intersection, which has a right-turn-only lane, is configured such that the right-turn-only lane is located to be adjacent to the center of the current travel road of the vehicle V, resulting in the division center line of the current travel road being deviated from the center of the current travel road. This therefore makes it possible for the lane identifier 32 to determine that the target intersection has a right-turn-only lane upon determining that the obtained minimum distance Z1 is larger than or equal to the predetermined threshold length.

Additionally, the lane identifier 32 is configured to obtain, based on the surrounding situation data, a width of a crossing road constituting the target intersection and crossing to the current travel road, and determine whether the width of the crossing road is shorter than or equal to a predetermined threshold width of, for example, 5 meters. Specifically, the lane identifier 32 determines that the vehicle V is capable of only going straight ahead upon determining that the width of the crossing road is shorter than or equal to the predetermined threshold width.

Moreover, the lane identifier 32 is configured to determine, based on the surrounding situation data, whether there is a road across the target intersection along the traveling direction of the vehicle V, and determine that the vehicle V is capable of only turning right or left in the target intersection upon determining that there is not a road across the target intersection along the traveling direction of the vehicle V.

Figure 10:
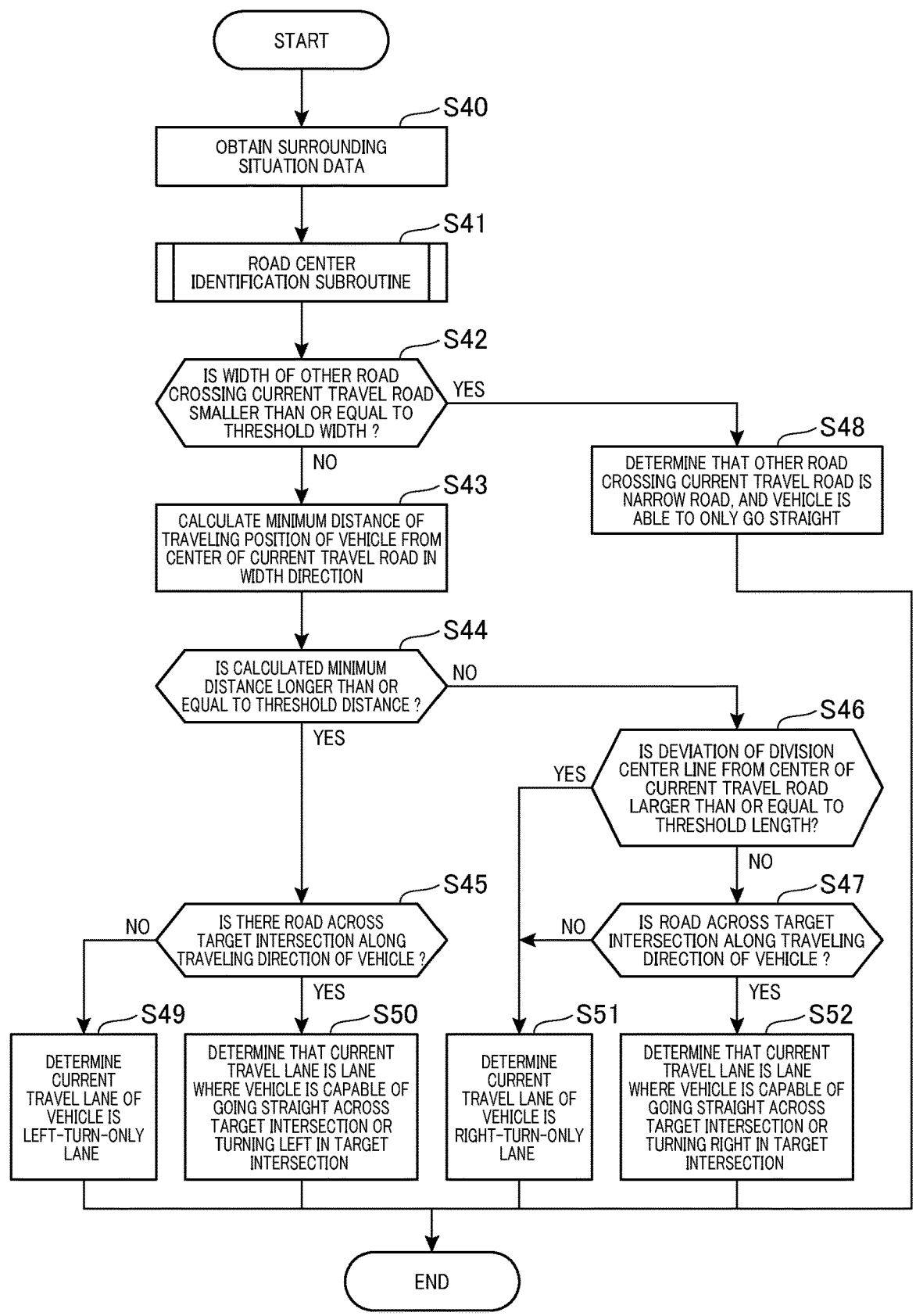
FIG. 10 is a flowchart schematically illustrating the sequence of a lane identification routine according to the second embodiment.

Next, the following describes, with reference to the flow-chart of FIG. 10, the sequence of a lane identification routine periodically carried out by the load identifier 32 of the intersection lane identification apparatus 2. One lane identification routine carried out by the intersection lane identification apparatus 2 will also be referred to as a cycle.

When starting the intersection lane identification routine, the intersection lane identification apparatus 2 serves as, for example, the data obtainer 30 to receive surrounding situation data monitored by and sent from the surrounding monitor 20 in step S40.

Next, the intersection lane identification apparatus 2 serves as, for example, the road center identifier 31 to perform a road center identification subroutine in step S41, which is the same as the road center identification subroutine illustrated in FIG. 6.

In response to the termination of the road center identification subroutine in S41, the intersection lane identification apparatus 2 serves as, for example, the lane identifier 32 obtains the width of the at least one other road crossing the current travel road of the vehicle V in accordance with the surrounding situation data obtained in step S40 or the surrounding situation data currently obtained from the surrounding monitor 20 in step S42. Then, the lane identifier 32 determines whether the obtained width of the at least one other road crossing the current travel road is smaller than or equal to the predetermined threshold width in step S42.

Upon determining that the obtained width of the at least one other road crossing the current travel road is smaller than or equal to the predetermined threshold width (YES in step S42), the lane identifier 32 determines that the at least one other road crossing the current travel road is a narrow road where it is difficult for vehicles to travel, thus determining that a lane where the vehicle V is traveling included in the current travel road is a straight only lane where the vehicle V is able to only go straight in step S48. The lane where the vehicle V is traveling will also be referred to as a current travel lane. Thereafter, the lane identifier 32 terminates lane identification routine.

Otherwise, when it is determined that the obtained width of the at least one other road crossing the current travel road is larger than or equal to the predetermined threshold width (NO in step S42), the lane identification routine proceeds to step S43.

In step S43, the lane identifier 32 calculates, based on the road center data obtained by the road center identifier 31, a minimum distance of the traveling position of the vehicle V from the center of the current travel road in the width direction of the current travel road. Then, the lane identifier 32 determines whether the obtained minimum distance is longer than or equal to the predetermined threshold distance of, for example, 3 meters in step S44.

Upon determining that the obtained minimum distance is longer than or equal to the predetermined threshold distance (YES in step S44), the lane identifier 32 determines whether there is a road across the target intersection along the traveling direction of the vehicle V in step S45.

Upon determining that there is not a road across the target intersection along the traveling direction of the vehicle V (NO in step S45), the lane identifier 32 determines that the current travel lane is a lane where the vehicle V is capable of only turning left in the target intersection in step S49. Thereafter, the lane identifier 32 terminates lane identification routine.

Otherwise, upon determining that there is a road across the target intersection along the traveling direction of the vehicle V (YES in step S45), the lane identifier 32 determines that the current travel lane is a lane where the vehicle V is capable of going straight across the target intersection or turning left in the target intersection in step S50. Thereafter, the lane identifier 32 terminates lane identification routine.

On the other hand, upon determining that the obtained minimum distance is smaller than the predetermined threshold distance (NO in step S44), the lane identifier 32 detects a division center line of a traveling-directional road across the target intersection in accordance with the surrounding situation data obtained in step S40 or the surrounding situation data currently obtained from the surrounding monitor 20 to accordingly obtain the minimum distance Z1 of the extending line of the division center line from the center of the current travel road in step S46.

Then, in step S46, the lane identifier 32 determines whether the obtained minimum distance Z1 is larger than or equal to the predetermined threshold length of, for example, 0.5 meters.

Upon determining that the obtained minimum distance Z1 is larger than or equal to the predetermined threshold length (YES in step S46), the lane identifier 32 determines that the current travel lane is a right-turn-only lane where the vehicle V is capable of only turning right in the target intersection in step S51. Thereafter, the lane identifier 32 terminates lane identification routine.

Otherwise, upon determining that the obtained minimum distance Z1 is smaller than the predetermined threshold length (NO in step S46), the lane identifier 32 determines whether there is a road across the target intersection along the traveling direction of the vehicle V in step S47.

Upon determining that there is not a road across the target intersection along the traveling direction of the vehicle V (NO in step S47), the lane identifier 32 determines that the current travel lane is a right-turn-only lane where the vehicle V is capable of only turning right in the target intersection in step S51. Thereafter, the lane identifier 32 terminates lane identification routine.

Otherwise, upon determining that there is a road across the target intersection along the traveling direction of the vehicle V (YES in step S47), the lane identifier 32 determines that the current travel lane is a lane where the vehicle V is capable of going straight across the target intersection or turning right in the target intersection in step S52. Thereafter, the lane identifier 32 terminates lane identification routine.

As described above, the intersection lane identification apparatus 2 is configured to identify how the current travel lane of the vehicle V joins to the target intersection that constitutes a part of the intersection more easily based on the identified location of the center of the current travel road.

Modifications

At least part of all functions provided by the apparatus 1 or 2 can be implemented by at least one processor; the at least one processor can be comprised of
  (1) The combination of at least one programmed processing unit, i.e. at least one programmed logic circuit, and at least one memory including software that causes the at least one programed logic circuit to implement all the functions
  (2) At least one hardwired logic circuit that implements all the functions
  (3) At least one hardwired-logic and programmed-logic hybrid circuit that implements all the functions An intersection lane identification apparatus according to a first exemplary aspect of the second embodiment includes a data obtainer configured to obtain, from a surrounding monitor that monitors a surrounding situation around a vehicle traveling on a road, data indicative of the surrounding situation monitored by the surrounding monitor. The intersection lane identification apparatus includes a road center identifier configured to identify a location of a center of the road based on the data indicative of the surrounding situation around the vehicle, and a lane identifier.

The lane identifier is configured to
  (i) Obtain, based on the identified location of the center of the road, a minimum distance of a traveling position of the vehicle from the identified location of the center of the road
  (ii) Determine whether the obtained minimum distance is longer than or equal to a predetermined threshold distance
  (iii) Identify that the vehicle is located at a left turnable lane upon determining that the obtained minimum distance is longer than or equal to the predetermined threshold distance
  (iv) Identify that the vehicle is located at a right turnable lane upon determining that the obtained minimum distance is shorter than the predetermined threshold distance The lane identifier according to a second exemplary aspect of the second embodiment is configured to
  1. Detect, based on the data indicative of the surrounding situation around the vehicle, a division center line of a traveling directional road across the intersection
  2. Obtain a deviation of the division center line from the identified location of the center of the road
  3. Determine whether the obtained deviation is larger than or equal to a predetermined threshold length
  4. Identify that the intersection has a right-turn-only lane upon determining that the obtained deviation is larger than or equal to the predetermined threshold length The lane identifier according to a third exemplary aspect of the second embodiment is configured to
  (1) Detect, based on the data indicative of the surrounding situation around the vehicle, a width of a crossing road constituting the intersection and crossing to the road;

(2) Determine whether the width of the crossing road is shorter or equal to a predetermined threshold width; and (3) Determine that the vehicle is capable of only going straight ahead upon determining that the width of the crossing road is shorter than or equal to the predetermined threshold width The lane identifier according to a fourth exemplary aspect of the second embodiment is further configured to 1. Determine, based on the data indicative of the surrounding situation around the vehicle, whether there is a road across the intersection along a traveling direction of the vehicle; and 2. Determine that the vehicle is capable of only turning right or left in the intersection upon determining that there is not a road across the target intersection along the traveling direction of the vehicle.

An intersection lane identification method according to a fifth exemplary aspect of the second embodiment includes 1. Obtaining, from a surrounding monitor that monitors a surrounding situation around a vehicle traveling on a road, data indicative of the surrounding situation monitored by the surrounding monitor 2. Identifying a location of a center of the road based on the data indicative of the surrounding situation around the vehicle 3. Obtaining, based on the identified location of the center of the road, a minimum distance of a traveling position of the vehicle from the identified location of the center of the road 4. Determining whether the obtained minimum distance is longer than or equal to a predetermined threshold distance 5. Identifying that the vehicle is located at a left turnable lane upon determining that the obtained minimum distance is longer than or equal to the predetermined threshold distance 6. Identifying that the vehicle is located at a right turnable lane upon determining that the obtained minimum distance is shorter than the predetermined threshold distance A computer-readable program product according to a sixth exemplary aspect of the second embodiment includes a non-transitory computer-readable storage medium, and a set of computer program instructions stored in the computer-readable storage medium, the instructions causing a computer to 1. Obtain, from a surrounding monitor that monitors a surrounding situation around a vehicle traveling on a road, data indicative of the surrounding situation monitored by the surrounding monitor 2. Identify a location of a center of the road based on the data indicative of the surrounding situation around the vehicle 3. Obtain, based on the identified location of the center of the road, a minimum distance of a traveling position of the vehicle from the identified location of the center of the road 4. Determine whether the obtained minimum distance is longer than or equal to a predetermined threshold distance 5. Identify that the vehicle is located at a left turnable lane upon determining that the obtained minimum distance is longer than or equal to the predetermined threshold distance 6. Identify that the vehicle is located at a right turnable lane upon determining that the obtained minimum distance is shorter than the predetermined threshold distance While illustrative embodiments of the present disclosure have been described herein, the present disclosure is not limited to the embodiments and their modifications described herein, but includes any and all embodiments having modifications, omissions, combinations (e.g., of aspects across various embodiments), adaptations and/or alterations as would be appreciated by those in the art based on the present disclosure within the scope of the present disclosure.

For example, each of the technical features described in each embodiment and its modifications can be replaced with a known structure having the same function as the corresponding technical feature. Each of the technical features described in each embodiment and its modifications can also be combined with at least one of the other technical features. At least one of the technical features described in each embodiment and its modifications can further be eliminated unless the at least one of the technical features is described as an essential element in the present specification.

The functions of each of the apparatuses 1 and 2 according to the first and second embodiments can be implemented by various embodiments; the various embodiments include apparatuses and systems, programs for serving a computer as the functions, storage media, such as non-transitory media, storing the programs, and autonomous driving control methods.

What is claimed is:

1. An apparatus for localizing a center of an intersection, the apparatus comprising:

a surrounding monitor comprising at least one of a vehicular camera and a radar device, which capture monitor data indicative of a surrounding situation around a vehicle traveling on a road;

a data obtainer configured to obtain, from the surrounding monitor captured by the at least one of the vehicular camera and the radar device, the monitor data indicative of the surrounding situation around the vehicle;

a road center identifier configured to identify a location of a center of the road based on the monitor data indicative of the surrounding situation around the vehicle;

a traffic light detector configured to detect, based on the monitor data indicative of the surrounding situation around the vehicle, at least two traffic light devices located in an intersection to which the road joins; and a center localization unit configured to detect an intersection point between the location of the center of the road identified by the road center identifier and a line connecting between the at least two traffic light devices detected by the traffic light detector, thus localizing the detected intersection point as a center of the intersection, wherein the traffic light detector is configured to detect, as the at least two traffic light devices, at least three traffic light devices located in the intersection, the apparatus further comprising:

a pair selector configured to calculate:

a longitudinal distance between each adjacent pair of the at least three traffic light devices along a first direction parallel to a traveling direction of the vehicle in accordance with the data indicative of the surrounding situation around the vehicle; and a lateral distance between each adjacent pair of the at least three traffic light devices along a second direction perpendicular to a traveling direction of the vehicle in accordance with the data indicative of the surrounding situation around the vehicle, the pair selector being configured to select at least one target pair of traffic light devices from the at least three traffic light devices, for which a value of the longitudinal distance of the target pair of traffic light devices is larger than or equal to a width of the road and a value of the lateral distance of the at least one target pair of traffic light devices is larger than or equal to the width of the road, the center localization unit being configured to detect the intersection point between the center of the current travel road and the line connecting between the selected at least one target pair of traffic light devices, the pair selector is configured to select, as the at least one target pair of traffic light devices, at least two target pairs of traffic light devices, and of the at least two target pairs of traffic light devices, the pair selector is configured to select one of the at least two target pairs of traffic light devices, the value of the longitudinal distance of the selected one of the at least two target pairs of traffic light devices being largest in the at least two target pairs of traffic light devices, the center localization unit being configured to detect the intersection point between the center of the current travel road and the line connecting between the selected one of the at least two target pairs of traffic light devices.

2. The apparatus according to claim 1, wherein:
the road center identifier is configured to:
detect left and right edges of the road based on the data indicative of the surrounding situation around the vehicle; and
identify, as the location of the center of the road, a location of an imaginary line that is equidistant from the detected left and right edges of the road.

3. The apparatus according to claim 2, wherein, when the road center identifier does not detect the left edge of the road, the road center identifier is configured to perform a road center identification task to:
count the number of one or more other vehicles located on a left side of the vehicle in a lateral direction of the vehicle to block a view from the vehicle to the left edge of the vehicle;
estimate, based on the counted number of one or more other vehicles, a minimum distance to the left edge of the road from the vehicle; and
identify, based on the detected right edge and the estimated minimum distance to the left edge of the road from the vehicle, the location of the center of the road.

4. The apparatus according to claim 3, wherein:
the road center identifier is configured to:
calculate an absolute difference between the estimated minimum distance and the value of the lateral distance;
determine whether the calculated absolute difference is greater or equal to a predetermined threshold; and
perform the road center identification task again upon determining that the calculated absolute difference is greater or equal to the predetermined threshold.

5. The apparatus according to claim 2, wherein, when the road center identifier does not detect the right edge of the road, the road center identifier is configured to perform a road center identification task to:
count the number of one or more other vehicles located on a right side of the vehicle in a lateral direction of the vehicle to block a view from the vehicle to the right edge of the vehicle;
estimate, based on the counted number of one or more other vehicles, a minimum distance to the right edge of the road from the vehicle; and
identify, based on the detected left edge and the estimated minimum distance to the right edge of the road from the vehicle, the location of the center of the road.

6. The apparatus according to claim 5, wherein:
the road center identifier is configured to:
calculate an absolute difference between the estimated minimum distance and the value of the lateral distance;
determine whether the calculated absolute difference is greater or equal to a predetermined threshold; and
perform the road center identification task again upon determining that the calculated absolute difference is greater or equal to the predetermined threshold.

7. An intersection lane identification apparatus comprising:
a surrounding monitor comprising at least one of a vehicular camera and a radar device, which capture monitor data indicative of a surrounding situation around a vehicle traveling on a road;
an intersection center localization apparatus comprising:
a data obtainer configured to obtain, from the surrounding monitor captured by the at least one of the vehicular camera and the radar device, the monitor data indicative of the surrounding situation around the vehicle;
a road center identifier configured to identify a location of a center of the road based on the monitor data indicative of the surrounding situation around the vehicle;
a traffic light detector configured to detect, based on the monitor data indicative of the surrounding situation around the vehicle, at least two traffic light devices located in an intersection to which the road joins; and
a center localization unit configured to detect an intersection point between the location of the center of the road identified by the road center identifier and a line connecting between the at least two traffic light devices detected by the traffic light detector, thus localizing the detected intersection point as a center of the intersection; and
a lane identifier configured to:
obtain, based on the localized center of the intersection, a minimum distance of a traveling position of the vehicle from the localized center of the intersection in a width direction of the road;
determine whether the obtained minimum distance is longer than or equal to a predetermined threshold distance;
identify that the vehicle is located at a left turnable lane upon determining that the obtained minimum distance is longer than or equal to the predetermined threshold distance; and
identify that the vehicle is located at a right turnable lane upon determining that the obtained minimum distance is shorter than the predetermined threshold distance, wherein
the traffic light detector is configured to detect, as the at least two traffic light devices, at least three traffic light devices located in the intersection, the apparatus further comprising:

a pair selector configured to calculate:
a longitudinal distance between each adjacent pair of the at least three traffic light devices along a first direction parallel to a traveling direction of the vehicle in accordance with the data indicative of the surrounding situation around the vehicle; and
a lateral distance between each adjacent pair of the at least three traffic light devices along a second direction perpendicular to a traveling direction of the vehicle in accordance with the data indicative of the surrounding situation around the vehicle,
the pair selector being configured to select at least one target pair of traffic light devices from the at least three traffic light devices, for which a value of the longitudinal distance of the target pair of traffic light devices is larger than or equal to a width of the road and a value of the lateral distance of the at least one target pair of traffic light devices is larger than or equal to the width of the road,
the center localization unit being configured to detect the intersection point between the center of the current travel road and the line connecting between the selected at least one target pair of traffic light devices,
the pair selector is configured to select, as the at least one target pair of traffic light devices, at least two target pairs of traffic light devices, and
of the at least two target pairs of traffic light devices, the pair selector is configured to select one of the at least two target pairs of traffic light devices,
the value of the longitudinal distance of the selected one of the at least two target pairs of traffic light devices being largest in the at least two target pairs of traffic light devices,
the center localization unit being configured to detect the intersection point between the center of the current travel road and the line connecting between the selected one of the at least two target pairs of traffic light devices.

8. The intersection lane identification apparatus according to claim 7, wherein:
the lane identifier is configured to:
detect, based on the data indicative of the surrounding situation around the vehicle, a division center line of a traveling directional road across the intersection;
obtain a deviation of the division center line from the localized center of the intersection;
determine whether the obtained deviation is larger than or equal to a predetermined threshold length; and
identify that the intersection has a right-turn-only lane upon determining that the obtained deviation is larger than or equal to the predetermined threshold length.

9. The intersection lane identification apparatus according to claim 7, wherein:
the lane identifier is configured to:
detect, based on the data indicative of the surrounding situation around the vehicle, a width of a crossing road constituting the intersection and crossing to the road;
determine whether the width of the crossing road is shorter than or equal to a predetermined threshold width; and
determine that the vehicle is capable of only going straight ahead upon determining that the width of the crossing road is shorter than or equal to the predetermined threshold width.

10. The intersection lane identification apparatus according to claim 7, wherein:
the lane identifier is configured to:
determine, based on the data indicative of the surrounding situation around the vehicle, whether there is a road across the intersection along a traveling direction of the vehicle; and
determine that the vehicle is capable of only turning right or left in the intersection upon determining that there is not a road across the target intersection along the traveling direction of the vehicle.

11. A method of localizing a center of an intersection, the method comprising:
obtaining, from a surrounding monitor comprising at least one of a vehicular camera and a radar device, which capture monitor data indicative of a surrounding situation around a vehicle traveling on a road, the monitor data indicative of the surrounding situation monitored by the surrounding monitor;
identifying a location of a center of the road based on the monitor data indicative of the surrounding situation around the vehicle;
detecting, based on the monitor data indicative of the surrounding situation around the vehicle, at least two traffic light devices located in an intersection to which the road joins; and
detecting an intersection point between the location of the center of the road and a line connecting between the at least two traffic light devices, thus localizing the detected intersection point as a center of the intersection, wherein
at least three traffic light devices located in the intersection are detected as the at least two traffic light devices, the method further comprising:
calculating a longitudinal distance between each adjacent pair of the at least three traffic light devices along a first direction parallel to a traveling direction of the vehicle in accordance with the data indicative of the surrounding situation around the vehicle; and
calculating a lateral distance between each adjacent pair of the at least three traffic light devices along a second direction perpendicular to a traveling direction of the vehicle in accordance with the data indicative of the surrounding situation around the vehicle,
at least one target pair of traffic light devices are selected from the at least three traffic light devices, for which a value of the longitudinal distance of the target pair of traffic light devices is larger than or equal to a width of the road and a value of the lateral distance of the at least one target pair of traffic light devices is larger than or equal to the width of the road,
the intersection point is detected between the center of the current travel road and the line connecting between the selected at least one target pair of traffic light devices,
at least two target pairs of traffic light devices are selected as the at least one target pair of traffic light devices, and
of the at least two target pairs of traffic light devices, one of the at least two target pairs of traffic light devices are selected,
the value of the longitudinal distance of the selected one of the at least two target pairs of traffic light devices being largest in the at least two target pairs of traffic light devices,
the intersection point is detected between the center of the current travel road and the line connecting between the selected one of the at least two target pairs of traffic light devices.

12. A computer-readable program product comprising:
a non-transitory computer-readable storage medium; and
a set of computer program instructions stored in the computer-readable storage medium, the instructions causing a computer to:
  obtain, from a surrounding monitor comprising at least one of a vehicular camera and a radar device, which capture monitor data indicative of a surrounding situation around a vehicle traveling on a road, the monitor data indicative of the surrounding situation monitored by the surrounding monitor;
  identify a location of a center of the road based on the monitor data indicative of the surrounding situation around the vehicle;
  detect, based on the monitor data indicative of the surrounding situation around the vehicle, at least two traffic light devices located in an intersection to which the road joins; and
detect an intersection point between the location of the center of the road and a line connecting between the at least two traffic light devices, thus localizing the detected intersection point as a center of the intersection, wherein
at least three traffic light devices located in the intersection are detected as the at least two traffic light devices, the instructions further cause the computer to:
calculate a longitudinal distance between each adjacent pair of the at least three traffic light devices along a first direction parallel to a traveling direction of the vehicle in accordance with the data indicative of the surrounding situation around the vehicle; and calculate a lateral distance between each adjacent pair of the at least three traffic light devices along a second direction perpendicular to a traveling direction of the vehicle in accordance with the data indicative of the surrounding situation around the vehicle, at least one target pair of traffic light devices are selected from the at least three traffic light devices, for which a value of the longitudinal distance of the target pair of traffic light devices is larger than or equal to a width of the road and a value of the lateral distance of the at least one target pair of traffic light devices is larger than or equal to the width of the road, the intersection point is detected between the center of the current travel road and the line connecting between the selected at least one target pair of traffic light devices, at least two target pairs of traffic light devices are selected as the at least one target pair of traffic light devices, and of the at least two target pairs of traffic light devices, one of the at least two target pairs of traffic light devices are selected, the value of the longitudinal distance of the selected one of the at least two target pairs of traffic light devices being largest in the at least two target pairs of traffic light devices, the intersection point is detected between the center of the current travel road and the line connecting between the selected one of the at least two target pairs of traffic light devices.

* * * * *